United States Patent [19]
Pöttrich

[11] 3,993,165
[45] Nov. 23, 1976

[54] LUBRICANT DOSING DEVICE

[75] Inventor: Erhard Pöttrich, Konigswalde, Germany

[73] Assignee: VEB Schmiergeratewerk Saxonia, Schwarzenberg, Erzgeb., Germany

[22] Filed: Oct. 20, 1975

[21] Appl. No.: 623,579

[52] U.S. Cl. .............................. 184/7 F; 137/270
[51] Int. Cl.² ....................................... F01M 1/06
[58] Field of Search............ 184/7 R, 7 D, 7 E, 7 F; 137/267, 268, 269, 270, 271

[56] References Cited
UNITED STATES PATENTS

| | | | |
|---|---|---|---|
| 2,331,924 | 10/1943 | Nemetz | 184/7 E |
| 2,690,816 | 10/1954 | Pawling | 184/7 F |
| 3,219,146 | 11/1965 | Leese | 184/7 F |
| 3,220,375 | 11/1965 | Gruber | 184/7 D |
| 3,330,380 | 7/1967 | Fujita | 184/7 F |
| 3,901,267 | 8/1975 | Moon | 137/270 |

*Primary Examiner*—Richard C Pinkham
*Assistant Examiner*—Marvin Siskind
*Attorney, Agent, or Firm*—Tab T. Thein

[57] ABSTRACT

Lubricant dosing device for double-action, two-conduit central lubricating systems, wherein a housing has therein two piston chambers, an outlet control chamber, two inlets for a pressurized lubricant, and two outlets for predetermined dosed amounts of the lubricant. One chamber is for a control piston and the other for a dosing piston; the longitudinal axes of all three chambers preferably pass through corners of an imaginary triangle perpendicular to the main axis of the housing. As a main feature, a reversible closing member is insertable in the control chamber, preferably including at least two communicating spaces, bores or grooves, by the aid of which the predetermined dosed amounts of the lubricant can be discharged, by the reciprocation of the dosing piston, selectively through one outlet of the device, when the closing member is inserted in one operative position, and through both outlets, when the closing member is axially reversed before insertion in the control chamber in another operative position. Preferably the axes of the Lubricant outlets also pass through one of the corners of the imaginary triangle.

9 Claims, 5 Drawing Figures

LUBRICANT DOSING DEVICE

The invention relates to a lubricant dosing device, more particularly for double-action, two-conduit central lubricating systems, for feeding appropriately dosed or metered amounts of the lubricant to one or two connected points of lubrication.

In an exemplary embodiment of the inventive device, a dosing piston and a control piston are provided, two pressurized inlet bores for admitting the lubricant to the device, and two outlets for discharging the dosed amounts of the lubricant, interconnected by means of appropriate lines or channels.

A proportioning device is known for central lubricating systems having alternately fed double conduits that cooperate in at least one pair, its outlets being connected by one or two channels, also comprising a dosing piston and a control piston.

The outlet channels that are connected through the cylinder space of the control piston have branch channels assigned thereto, which latter open into a chamber provided with an inner thread, a threaded plug being so disposed in the chamber that alternatively the connection between the two branch channels is interrupted, for separating the two outlets, and the connection between the channels is maintained, namely by providing an annular packing between the bottom of the chamber and the threaded plug, and by a dummy or blind closure at or in one of the outlets.

The bore diameter of the applied annular groove is so dimensioned that it includes extreme spacing values of the two branch channels, thereby obtaining a connecting lubricant flow from one channel to the other, for each stroke of the control piston, and only one outlet channel is fed by the lubricant flow.

If the branch channels are closed at the bottom of the chamber by the use of the dummy plug, dispensing with the dummy or blind closure at the outlet channel, each outlet receives the lubricant flow with alternating strokes of the control piston. The adjustment or setting of the dosing device gives a visible indication through the penetration depth of the threaded plug.

It is a disadvantage of this known proportioning device that the sequence of the dosing piston, the control piston, and the outlets is rather costly in terms of materials and structural details if a high degree of imperviousness or tightness is to be achieved. The switch-over of the device, as necessitated by mounting or installation work, from a single-point lubrication to two points, or vice versa, is difficult to accomplish, deficient in terms of sealing, and rather expensive, inevitably leading to unsatisfactory operational safety conditions.

Another disadvantage of the known proportioning device consists in that a serial arrangement of several lubrication points within a block would require substantially more material and expense.

It is one of the objects of the invention to free the designer and manufacturer of dosing devices from high material, manufacturing and installation expenditures, and to reduce the number of component parts.

It is furthermore the object of this invention to provide a dosing device for central lubricating systems having a double-action or controlled two-conduit system, which allows simplified adjustments for determining or controlling the lubricant flow toward one or two outlets, coupled with a low structural height of a single-unit arrangement, or a mounting row of several single units, at low cost yet with an increased safety in respect of sealing characteristics.

In accordance with one of the important features of the invention a simple reversible closing member is disposed in an outlet control channel or chamber, the member having selective discharging means, such as preferably an axial bore, a transversal bore, and an annular groove about its circumference, the installation being such that the latter groove can cover a branch channel of the device, which opens into the control chamber.

In accordance with a further, optional feature of the invention the closing member can be constructed such that when installed in one of two operative position, either both outlets are open, or one of the outlets is tightly sealed, preventing lubricant discharge therefrom.

A further inventive feature consists in that the cylinder bores for the dosing and the control pistons, as well as the outlet bores are preferably also provided in the device in a triangular configuration which requires only minimal structural measurements.

The inventive dosing device for central lubricant systems having a double-action two-conduit system constitutes a moderately priced, satisfactorily operating and completely sealed unit which requires only minimum installation height, being used either alone or as an attachment to other devices.

Other objects, features and many of the attendant advantages of the invention will be readily appreciated as the same becomes better understood by reference to the following detailed description, when considered with the accompanying drawing, wherein FIG. 1 is a longitudinal section of a closing member used in the lubricant dosing device according to the invention, for central lubricating systems having a double-action, two-conduit arrangement;

Figure 1:
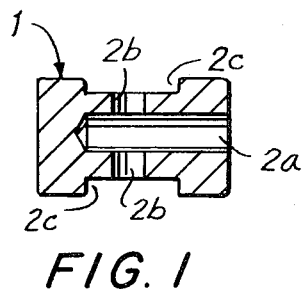
Figure 2:
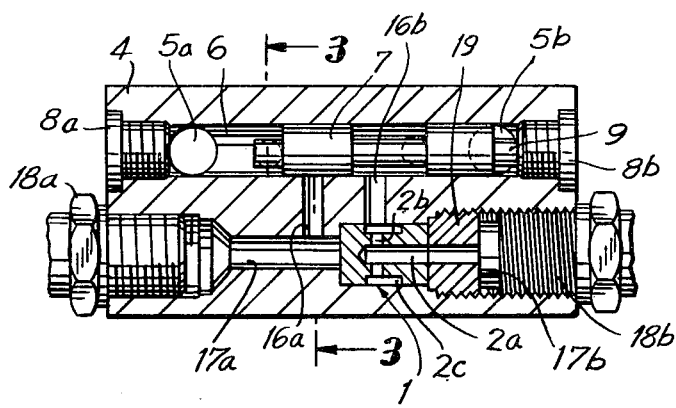
FIG. 2 is a longitudinal section of the device itself, along line 2—2 in FIG. 3, for dispensing the lubricant to two outlets.
Figure 4:
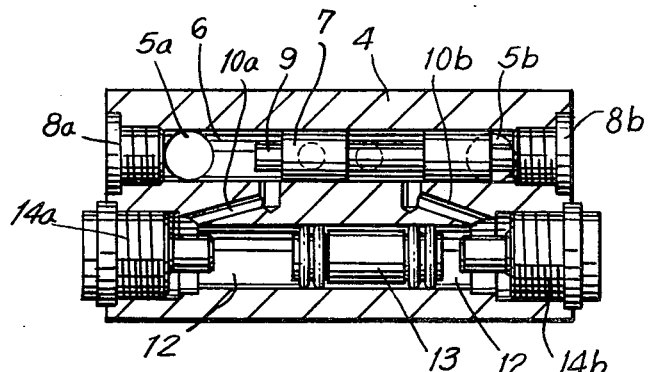
FIG. 4 is again a longitudinal sectional view but taken along line 4—4 in FIG. 3, similar in its upper portion to FIG. 2.

While the entire lubricant dosing device is shown in FIGS. 2 and 4, in complete sectional views, FIG. 1 relates to an important part thereof, namely a reversible closing member 1 used in the device in one of two axially opposed positions, the member having a substantially axial bore 2a, a transversal bore 2b, and an annular groove 2c about at least a portion of the member, as shown. The use and manner of operation of the closing member 1 will be described later in connection with FIGS. 2 and 2a.

As can be seen in FIG. 2, the device itself comprises a housing 4 which is fed with a pressurized lubricant, alternatively or simultaneously, through inlets 5a or 5b. The lubricant moves a slidable control piston 7 to one or the other of stops 8a, 8b that are tightly but removably inserted (e.g. threaded) into respective ends of a piston chamber 6 in which the piston 7 reciprocates. The piston can have one or two operative portions, the latter being included in the illustrations, for purposes of faster dosing action at the same amount of lubricant inflow. Linkages for the piston or pistons 7 are schematically shown at 9 (see FIG. 4).

By the movement of the piston 7, alternatively one of two connecting lines or channels 10a, 10b is allowed to pass the lubricant to a dosing chamber 12. In the latter, a dosing piston 13 can move between respective stops 14a, 14b, inserted (e.g. by threading) in the housing 4 in a manner similar to that of the stops 8a, 8b.

Figure 3:
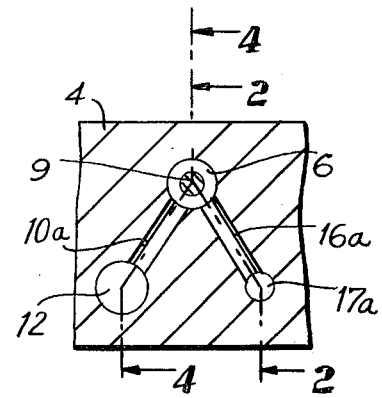
FIG. 3 is a vertical section view along line 3—3 in FIG. 2.

By reference to FIG. 3 it will be seen that the channels 10a, 10b are in one plane (only the former being visible), interconnecting the chambers 6 and 12, while another plane has therein outlet bores 16a, 16b (see also FIG. 2) that interconnect the chamber 6 with a bore or space 17a that is substantially parallel to the chambers 6 and 12.

The outlet bores 16a, 16b can be made to communicate with one or both of outlets 18a, 18b, as can be seen for example from FIG. 2, at either end of the bore 17a, while the reversible closing member 1 can be accommodated in a space 17b that communicates with the bore 17a and can simply form an extension thereof.

It can be seen that in FIG. 2 the member 1 is inserted with its closed end toward the left-hand side, so that the axial bore 2a allows communication from the outlet bore 16b to the actual outlet 18a, through the intermediary of the annular groove 2c, the transversal bore 2b, and the axial bore 2a in the member 1.

Figure 2A:
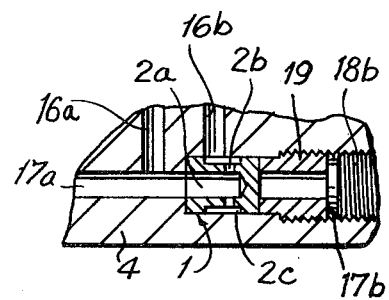
FIG. 2a is an enlarged sectional portion of the device of FIG. 2, but with the closing member axially reversed, for dispensing the lubricant to one outlet only.

In contradistinction, the partial view of FIG. 2a illustrates the member 1 axially reversed, that is with the closed end or wall toward the right-hand side, the lubricant flow from the outlet bore 16b being thus directed through the groove 2c and the bores 2b, 2a, and eventually to the bore 17a, which also communicates with the outlet bore 16a, so as to discharge all the dosed lubricant toward the left-hand device outlet 18a.

FIG. 2a also shows how the closing member 1 can be secured in the device, more particularly in the space 17b, by means of a threaded stud 19 which may also have a central bore that allows the dosed lubricant to flow toward the outlet 18b if the member 1 is in the position of FIG. 2. In FIG. 2a the bore of the stud 19 is of course blocked by the member 1.

It should be understood, of course, that the foregoing disclosure relates only to a preferred, exemplary embodiment of the inventive lubricant dosing device, and that it is intended to cover all changes and modifications of the example described which do not constitute departures from the spirit and scope of the invention.

What I claim is:

1. A lubricant dosing device for double-action two-conduit central lubricating systems, comprising: a housing having a main axis; a pair of pressurized lubricant inlets and a pair of outlets for predetermined dosed amounts of the lubricant in said housing; two elongated piston chambers defined by portions of said housing in a substantially parallel but spaced-apart relationship and having respective longitudinal axes; a control piston in one of said chambers, acted upon by the introduced pressurized lubricant, reciprocable between two discrete operative positions; a dosing piston in the other of said chambers, reciprocable between two extreme positions, to force the predetermined dosed amounts of the lubricant to at least one of said outlets; a pair of spaced-apart channels interconnecting said chambers; a pair of spaced-apart discharge bores leading from said one chamber to an elongated outlet control chamber also formed in said housing and having a longitudinal axis; and a closing member with a main axis, being insertable in a portion of said control chamber in two opposite, axially oriented operative positions, and including means for selectively discharging the dosed lubricant through only one of said outlets when said closing member is inserted into said control chamber in one operative position, and allowing the dosed lubricant to be discharged through both of said outlets when said closing member is inserted into said control chamber in the other operative position.

2. The lubricant dosing device as defined in claim 1, further comprising at least one removable stop for at least one of the ends of said piston chambers.

3. The lubricant dosing device as defined in claim 1, wherein said discharging means is constituted by at least two communicating spaces in said closing member, including a first bore substantially coinciding with said main axis of the closing member, and being closed at one end, for preventing the discharge of the dosed lubricant to the other of said outlets when said closing member is inserted in said one operative position.

4. The lubricant dosing device as defined in claim 3, wherein said at least two communicating spaces further include a second bore substantially transversal to and communicating with said first bore, and an annular groove about a portion of said closing member, in communication with said second bore therein.

5. The lubricant dosing device as defined in claim 1, wherein said longitudinal axes of the piston chambers and of the control chamber pass in substantially parallel relationship through corners of an imaginary triangle that is in a plane perpendicular to said main axis of the housing, and wherein said channels as well as said discharge bores constitute two of the sides of the imaginary triangle.

6. The lubricant dosing device as defined in claim 5, wherein the axes of said outlets for the dosed lubricant also pass through one of the corners of the imaginary triangle.

7. The lubricant dosing device as defined in claim 1, further comprising removable cap means for sealingly closing at least one end of said control chamber, to allow said closing member to be inserted in and removed from said portion of the latter and to be axially reversed before re-insertion, to operate the dosing device in one of said two operative positions.

8. The lubricant dosing device as defined in claim 7, further comprising a threaded stud also insertable in said portion of the control chamber, for securing said closing member therein.

9. The lubricant dosing device as defined in claim 8, wherein said threaded stud has a substantially axial bore therein through which the dosed lubricant can pass in its way from at least one of said discharge bores to one of said outlets.

* * * * *